US009249350B2

(12) United States Patent
Smith et al.

(10) Patent No.: US 9,249,350 B2
(45) Date of Patent: Feb. 2, 2016

(54) BITUMEN ANTI-ACCRETION ADDITIVE

(75) Inventors: Clayton Smith, Edmonton (CA); Simon John Michael Levey, Edmonton (CA); Yonglin (Ginger) Ren, Edmonton (CA)

(73) Assignee: LUBRIZOL OILFIELD SOLUTIONS, INC., Wickliffe, OH (US)

( * ) Notice: Subject to any disclaimer, the term of this patent is extended or adjusted under 35 U.S.C. 154(b) by 208 days.

(21) Appl. No.: 12/779,827

(22) Filed: May 13, 2010

(65) Prior Publication Data

US 2010/0298173 A1 Nov. 25, 2010

Related U.S. Application Data

(60) Provisional application No. 61/179,652, filed on May 19, 2009.

(51) Int. Cl.
*C09K 8/24* (2006.01)
*C09K 8/524* (2006.01)
*C08L 71/02* (2006.01)
*C08L 83/04* (2006.01)
C08G 77/16 (2006.01)
C08G 77/46 (2006.01)

(52) U.S. Cl.
CPC ............. *C09K 8/524* (2013.01); *C08L 71/02* (2013.01); *C08L 83/04* (2013.01); *C08G 77/16* (2013.01); *C08G 77/46* (2013.01); *C08L 2205/05* (2013.01)

(58) Field of Classification Search
None
See application file for complete search history.

(56) References Cited

U.S. PATENT DOCUMENTS

| 4,078,104 | A | * | 3/1978 | Martin | 427/387 |
| 5,322,554 | A | * | 6/1994 | DeLong | 106/14.11 |
| 6,143,812 | A | * | 11/2000 | Martin et al. | 524/43 |
| 6,506,444 | B1 | * | 1/2003 | Mahr et al. | 427/138 |
| 2002/0144628 | A1 | * | 10/2002 | Honma et al. | 106/123.13 |
| 2006/0141270 | A1 | | 6/2006 | Zaki et al. | |

FOREIGN PATENT DOCUMENTS

| CA | 2280466 | 2/2000 |
| CA | 2454312 | 1/2003 |
| CA | 2451585 | 6/2004 |
| CA | 2508339 | 6/2004 |

(Continued)

OTHER PUBLICATIONS

International Search Report and Written Opinion of the International Searching Authority—corresponding PCT application PCT/CA2010/000710.

(Continued)

*Primary Examiner* — Alicia Bland
(74) *Attorney, Agent, or Firm* — Blank Rome, LLP

(57) ABSTRACT

Anti-accretion additives utilize silicone chemistry to prevent bituminous and heavy oil materials from sticking to metals surfaces such as drill bits, drillstring, casing and the like. Organopolysiloxanes and/or copolymers thereof are added directly to an aqueous drilling fluid or are first diluted in a solvent for adding to the drilling fluid. Further, an alkyl polyalkylene oxide may also be added. If a silicone oil is used as the solvent, the anti-accretion additive has the increased functionality of minimizing the amount of bituminous or heavy oil material which is retained in the drilling fluid when returned to surface and permits removal of the bituminous or heavy oil materials with the solids using conventional solids control equipment.

15 Claims, 6 Drawing Sheets

Xanthan at Ambient Pressure

(56) References Cited

FOREIGN PATENT DOCUMENTS

| CA | 2481543 | 3/2006 |
|---|---|---|
| CA | 2661202 | 3/2008 |
| WO | 2004050791 | 6/2004 |

OTHER PUBLICATIONS

AADE 01-NC-HO-56; Balling in Water-Based Muds, Ron Bland, Rolf Pessier and Matt Isbell; AADE National Drilling Technical Conference, 2001.

UK Examination Report dated Oct. 31, 2013 issued in respect of corresponding UK Patent Application No. 1119661.5.

"Copolymers" Online Definition provided at http://www.pslc.ws/macrog/copoly.htm by Polymer Science Learning Center, Department of Polymer Science, The University of Southern Mississippi, 2005.

Stevens, C., et al. "Fate and Effects of Polydimethylsiloxane (PDMS) in Marine Environments" Marine Pollution Bulletin vol. 42, No. 7, pp. 536-543 (2001).

* cited by examiner

BITUMEN ANTI-ACCRETION ADDITIVE

CROSS REFERENCE TO RELATED APPLICATIONS

This application claims the benefits under 35 U.S.C. 119(e) of the U.S. Provisional Application Ser. No. 61/179,652, filed on May 19, 2009, the entirety of which is incorporated herein by reference.

FIELD OF THE INVENTION

Embodiments of the invention relate to anti-accretion additives for addition to water-based drilling fluids to inhibit accretion of certain types of hydrocarbons on the drilling apparatus and more particularly to inhibit accretion of bitumen or heavy oil on drilling apparatus when drilling horizontal wellbores for steam assisted gravity drainage (SAGD) operations.

BACKGROUND OF THE INVENTION

There are numerous deposits of heavy oil and bitumen across the globe. Canada and Venezuela (Speight, 1990), in particular, have been estimated to account for greater than 3 trillion barrels of oil with the major reserves being split therebetween. The Canadian oil sand reserves play a significant role in the supply of oil for both Canada and the US today, and will for many years to come.

Drilling efficiency, using water-based drilling fluids or muds, is influenced to a large extent by the formations that are being drilled. Certain formations like the McMurray formation found in Alberta, Canada and the Orinoco Basin found in Venezuela are primarily made up of bitumen which can have a significant effect on the drilling efficiency due to the naturally sticky nature of the bitumen.

Bitumen is known to be a sticky, tar-like form of petroleum which can be so thick and heavy that it must be heated or diluted to encourage it to flow. At present there are two main methods that are used to recover bitumen from the oil sands in Alberta, Canada. The two methods are truck and shovel surface mining for subsequent extraction and steam assisted gravity drainage (SAGD). SAGD is used when the depth of the bitumen formation, such as in the Fort McMurray formation in Canada, is too deep to access and retrieve via the truck and shovel method. Two horizontal wells are drilled, one on top of the other with approximately 5 meters spacing therebetween. The shallower horizontal well is the injector well and is used to pump steam into the formation in order to treat and soften the bitumen and allow it to flow. The deeper horizontal well is the production well which collects the heated bitumen for pumping to surface. Typically SAGD wells are not deep wells and therefore water-based drilling muds do not require large volumes of weighting agents, such as calcium chloride, to be added during drilling.

During drilling, the bitumen may stick to the drill bit, bottom-hole assembly (BHA), drill-pipe and generally any of the drilling apparatus that has contact with the drilling fluid, which can lead to significant delay to the drilling operation. This delay may be due to trouble sliding the drilling apparatus and drillstring when orientating the drill string for drilling horizontal sections of SAGD wellbores as a result of the accretion of bitumen thereon, significantly affecting the rate of penetration (ROP). Delays may also be attributed to time required to clean the drill-pipe when tripping out of the hole. Further, delays are attributed to the need to slow the mud pumps while shaker screens, coated with bitumen, are changed and further to a slow down of the ROP with the slower mud pump speed.

SAGD drilling operations were initially plagued with severe issues due to the sticky nature of bitumen. Drilling fluids used conventionally at the time contained no additives to overcome the problems of drilling in bitumen and, as a result, the bitumen stuck to everything including the drillstring, casing and surface equipment which resulted in rig down-time and significant expenditure by the operator.

As a result of the earlier experiences with drilling in bitumen-containing formations, it became known to use additives within the fluid systems to attempt to inhibit bitumen accretion and, as a result, improve ROP. In the last ten years there have been a number of patents filed for drilling fluid systems or additives to overcome the problems associated with drilling SAGD wells.

The prior art anti-accretion systems or additives used to prevent bitumen from sticking are typically classed as either solvent and/or surfactant chemistry or encapsulator-type chemistry.

The first generation of solvent/surfactant systems worked by separating the bitumen from the sand and dissolving the bitumen so that it flowed easily and did not stick. The solvent and/or surfactant systems used either a solvent like D-limonene, as described in Canadian Patent 2,454,312 to McKenzie et al., or a hydrocracked base oil, as described in Canadian Patent 2,481,543 to Baltoiu et al, to solvate the bitumen. It was found however that by solvating the bitumen, problems with odor and tank cleaning arose due to the fact that the solvated bitumen floated on top of the returned drilling fluid in the mud pits.

A next generation of systems/additives utilized a surfactant, such as taught in Canadian Patent 2,451,585 to Wu et al., to emulsify the free bitumen into the returned drilling fluid therefore preventing it from separating and causing problems with odor and cleaning.

In the solvent and/or surfactant systems described herein, the major drawback is that the drilling fluids increasingly retain bitumen therein as the fluids are used, limiting the number of wells that can be drilled before the drilling fluids need to be stripped of the built-up bitumen. Further, each of the prior art solvent and/or surfactant systems generate at least two waste streams: partially oil-coated sand and solvated or emulsified bitumen.

The encapsulator-type chemistry system as described in Canadian Patent 2,508,339 to Ewanek et al., utilizes a cationic polyacrylamide and works by charge attraction to the anionic sites on the bitumen molecules. The cationic polyacrylamide water-wets the bitumen with the polymer coating through ionic attraction and keeps the bitumen and sand intact so that there is no dispersion. Only one waste stream is produced and the returned drilling fluid can be reused indefinitely as there is substantially no bitumen build-up in the system. The major drawback to the use of cationic polyacrylamides is that the cationic polyacrylamides make the drilling fluid extremely susceptible to flocculation of anionic polymers used for viscosity control in the drilling fluids. The addition of relatively small amounts of a cationic polyacrylamide reduce the effectiveness of Xanthan gum, a conventional anionic viscosifier, and thus higher concentrations of the Xanthan gum are required. If too high a concentration of cationic polyacrylamide is added, the drilling fluid system will flocculate causing the anionic polymers and solids to precipitate from the water phase which results in plugging or screen-out of the shale shakers. When the shale shakers screen-out, fluid cascades over the shale shaker rather than passing therethrough. The precipitation of polymers from the drilling fluid is extremely costly to the operator as it results in a need to stop the drilling process while a new fluid system is mixed. Additionally, cationic polyacrylamides are available as solids and must be hydrated prior to use.

Further, cationic polyacrylamides have a propensity to oil-wet sandstone which can cause formation damage.

Ideally, what is required is a drilling fluid or additive for drilling fluid which prevents bitumen from sticking to metal surfaces, which would solve many of the known problems related to the drilling of SAGD wells. Preferably, the drilling fluid would be easily mixed without detrimental effects or only minimal detrimental effects to the properties of the drilling fluid. Further, there is great interest in the industry to provide a fluid that not only prevents sticking, but which would also allow bitumen to be removed from returned drilling fluid, preferably using conventional solids control equipment.

SUMMARY OF THE INVENTION

A bitumen anti-accretion additive for addition to aqueous drilling fluids minimizes retention of bitumen to metal surfaces using silicone chemistry.

In a broad aspect of the invention, the bitumen anti-accretion additive for addition to an aqueous drilling fluid comprises a polysiloxane, a copolymer of polysiloxane or mixtures thereof as active ingredients therein.

In another broad aspect, an aqueous drilling fluid for use in subterranean formations having at least bituminous or heavy oil materials therein, the aqueous drilling fluid comprises an anti-accretion additive according to an embodiment of the invention.

In another broad aspect of the invention a method for minimizing bitumen accretion to metal surfaces and for minimizing bitumen retention in an aqueous drilling fluid returned to surface from a subterranean formation comprises: adding to the aqueous drilling fluid, an additive according to an embodiment of the invention.

The active ingredients can be added to the drilling mud directly or can be diluted in a solvent prior to addition to the drilling mud for ease of handling. Advantageously, if a silicone oil, such as polydimethylsiloxane, is used as the solvent, bituminous or heavy oil materials from the formation do not stick to metal surfaces and further do not disperse in the drilling fluid and are readily removed from the fluid at surface using conventional solids control equipment.

DETAILED DESCRIPTION OF THE PREFERRED EMBODIMENTS

Figure 1:
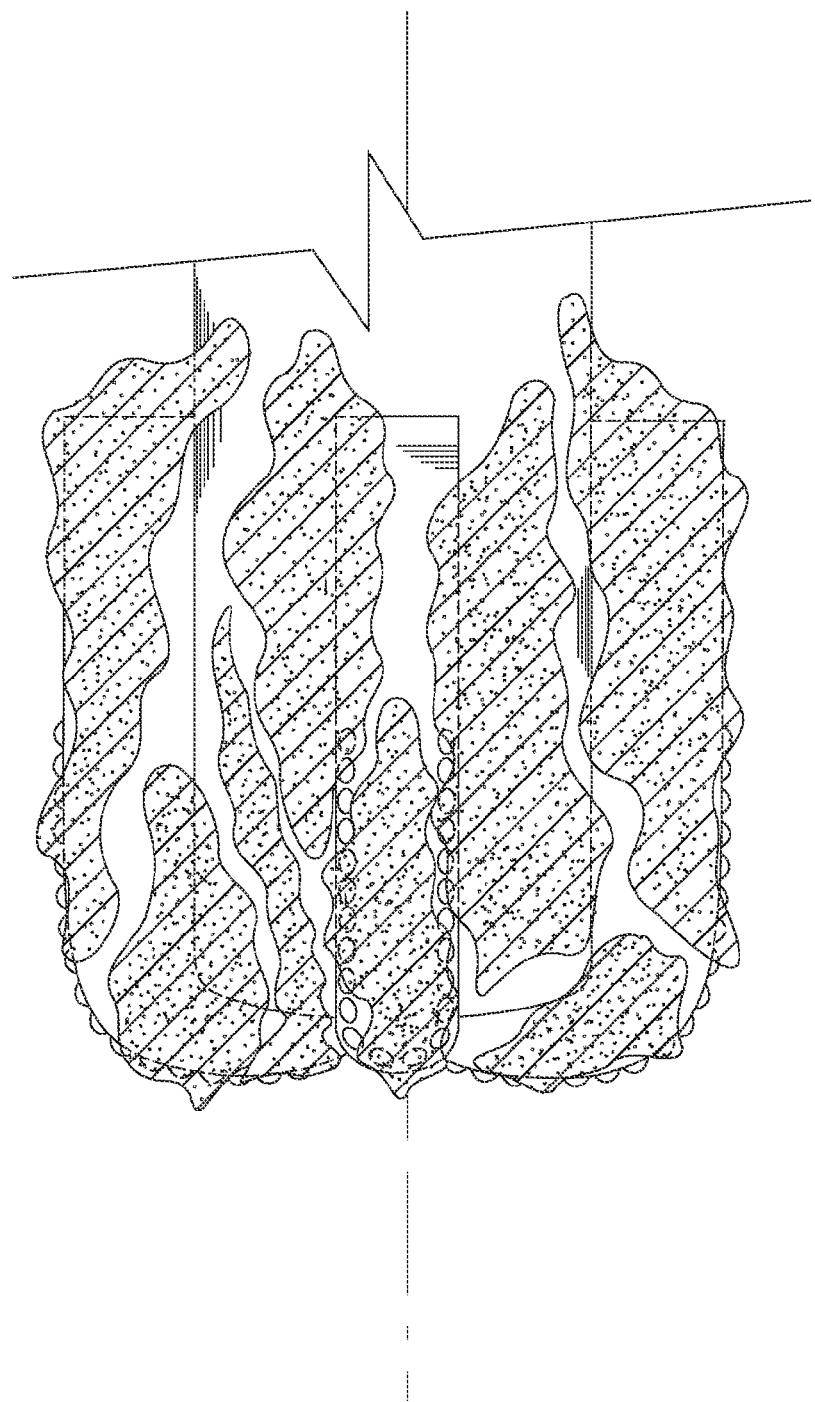
FIG. 1 is a side view of a drill bit which is affected by accretion, cutting elements of the drill bit being substantially coated with bituminous material.
Figure 2:
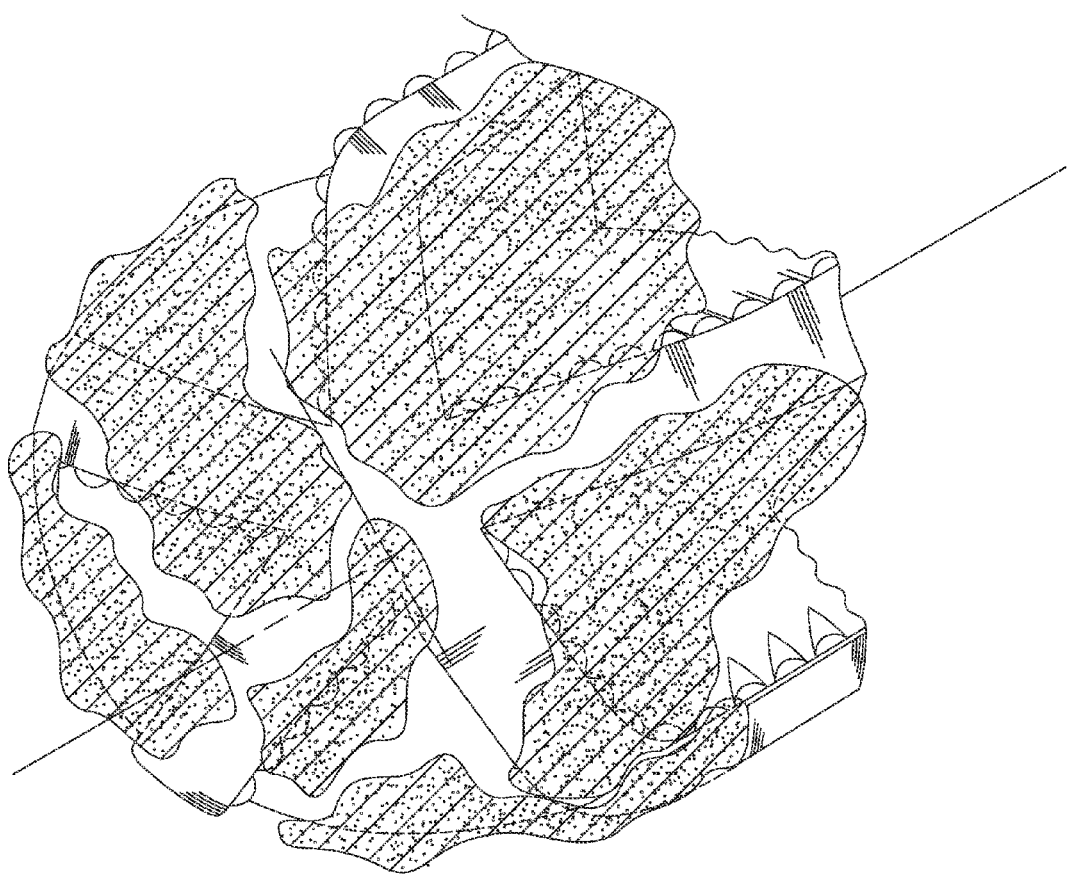
FIG. 2 is a perspective view of a drill bit affected by accretion, cutting elements of the drill bit being substantially coated with bituminous material.
Figure 3:
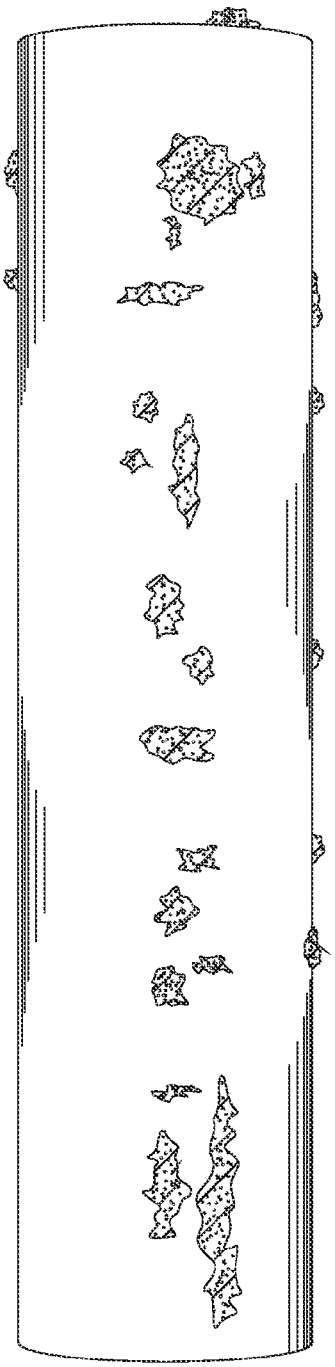
FIG. 3 is a side view of a metal surface evidencing some accretion thereon using a drilling fluid using Xanthan as a viscosifier at ambient pressure and without the addition of an anti-accretion additive according to Example 1 described herein.
Figure 4:
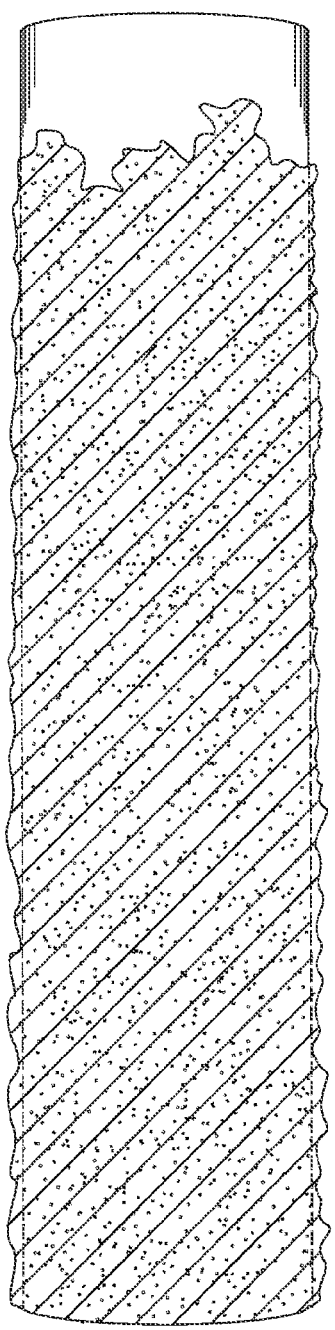
FIG. 4 illustrates the metal surface being substantially coated with accretion thereon using the drilling fluid as described for FIG. 3 at a pressure of 400 psi and according to Example 1 described herein.

FIGS. 1 and 2, published in "Balling in Water-Based Muds" by Ron Bland, Rolf Pessier and Matt Isbell at the AADE National Drilling Technical Conference 2001 (AADE 01-NC-HO-56), illustrate bit balling or accretion on a drill bit. Further, FIGS. 3 and 4 illustrate accretion of bitumen to metal surfaces when in contact with aqueous drilling fluids in the absence of embodiments of the invention.

Embodiments of the invention relate to an anti-accretion additive for mixing with water-based drilling fluids to prevent bitumen or heavy oil from sticking to metal surfaces. Further, embodiments of the invention permit easy separation of the bitumen and bitumen/sand from returned drilling fluid using conventional solids control equipment. Embodiments of the invention, when added to drilling fluids, do not substantially adversely affect the drilling fluid properties.

Anti-accretion additives according to embodiments of the invention are based on silicone chemistry which prevents bitumen from sticking to surfaces, particularly metal surfaces, and which can be easily mixed into a drilling fluid. More particularly, embodiments of the invention comprise a polysiloxane or a copolymer thereof and further may comprise an alkyl polyalkylene oxide.

Applicant believes that the embodiments of the invention prevent the bitumen from sticking to the metal surfaces because of the surface-active nature of silicone-containing compounds. The silicone-based additives are surface active because they are neither water nor oil soluble and therefore migrate to the interface between oil, water and solids and affect both surface and interfacial tension forces. Thus, the silicone-based additive acts like a non-stick coating, which allows the bitumen to encounter the metal surfaces without sticking thereto. Further, the silicone-based additives prevent the bitumen from becoming substantially dispersed in the drilling fluid which permits easy separation using conventional solids control equipment.

Embodiments of the invention are primarily applicable to drilling SAGD wells for the recovery of bitumen however embodiments of the invention are also useful in heavy oil applications.

In embodiments of the invention, the anti-accretion additive comprises an organopolysiloxane or a co-polymer of organopolysiloxanes such as a copolymer with a polyalkylene oxide or mixtures thereof and further may comprise alkyl polyalkylene oxide.

In other words, the active ingredient in an anti-accretion additive blend comprises either of an organopolysiloxane or a co-polymer of organopolysiloxanes and polyalkylene oxides alone or a blend thereof, and may include alkyl polyalkylene oxide. As appreciated by those skilled in the art, preparations of polyalkylene oxide copolymers of organopolysiloxanes typically comprise some unreacted polyalkylene oxide.

It is believed that alkyl polyalkylene oxide cannot be used alone.

In embodiments of the invention, the anti-accretion additive blend contains 0-100 wt %, 0-90 wt % or 0-80 wt % of organopolysiloxane component, provided that the sum of the concentrations of an organopolysiloxane and a co-polymer of organopolysiloxanes and polyalkylene oxides is larger than zero. That is to say there must be at least the organosiloxane or the co-polymer thereof and not the alkyl polyalkylene oxide alone.

In embodiments of the invention, the anti-accretion additive blend contains 0-100 wt %, 1-90 wt % or 5-80 wt % of a co-polymer of organopolysiloxanes and polyalkylene oxides provided the sum of the concentrations of the co-polymer of organopolysiloxanes and polyalkylene oxides components and an organopolysiloxane is larger than zero.

In embodiments of the invention, the anti-accretion additive blend contains 0-50 wt %, 0-40 wt % and or 0-30 wt % of the alkyl polyalkylene oxide component. In other words, the anti-accretion additive comprises less than 50 wt % of the alkyl polyalkylene oxide and in embodiments, may contain no alkyl polyalkylene oxide at all.

Organopolysiloxane

In embodiments of the invention, the organopolysiloxane component is selected from polyalkylsiloxanes, polyalkylsiloxane polyols, aminosiloxanes, and polyalkylsiloxanes containing fine particles, typically silica.

In embodiments of the invention using polyalkylsiloxanes as the organopolysiloxane component, the polyalkylsiloxanes are poly-dimethylsiloxanes having a viscosity in the ranges of about 10 centistokes (cSt) to about 10,000,000 cSt, about 50 cSt to about 1,000,000 cSt, or about 100 cSt to about 100,000 cSt.

In embodiments of the invention, using polyalkylsiloxane polyols as the organopolysiloxane component, the polyalkylsiloxane polyols are polyols of poly-dimethylsiloxane, having a viscosity in the range of about 10 cSt to about 10,000,000 cSt, about 50 cST to about 1,000,000 cSt, or about 100 cSt to about 100,000 cSt. Silanols are one embodiment of such polyalkylsiloxane polyols.

In embodiments of the invention using aminosiloxanes as the organopolysiloxane component, the aminosiloxanes are amino-modified poly-dimethylsiloxanes, (poly-dimethylsiloxanes substituted with one or more amino or alkylamino groups) having a viscosity in the range of about 10 cSt to about 10,000,000 cSt, about 50 cSt to about 1000,000 cSt, or about 100 cSt to about 100,000 cSt.

In embodiments of the invention using polyalkylsiloxanes containing silica particles as the organopolysiloxane component, the polyalkylsiloxanes containing silica particles are typically blends of poly-dimethylsiloxanes and hydrophilic and/or hydrophobic silica, having a viscosity in the range of about 10 cSt to about 10,000,000 cSt, about 50 cSt to about 1000,000 cSt, or about 100 cSt to about 100,000 cSt.

In embodiments of the invention, the blend of polyalkylsiloxanes filled with fine particles contains from about 0.01 wt % to about 30 wt %, about 0.05 wt % to about 20 wt % or from about 0.1 wt % to about 15 wt % fine particles.

Co-Polymers of Organopolysiloxanes and Polyalkylene Oxides

In embodiments of the invention the co-polymer of organopolysiloxanes and polyalkylene oxides is selected from co-polymers of polydimethylsiloxanes and polyethyleneoxides, polypropyleneoxides and polyethyleneoxide-polypropyleneoxide copolymers. The siloxanes and the polyalkyleneoxides are connected either via alkylene (Si—C linkage) or oxy-alkyl (Si—O—C linkage) bridges. Polyethyleneoxides, polypropylene oxides and polyethylene oxide-polypropylene oxides are derived from 1-50 ethyleneoxide and 1-50 propyleneoxide units or 1-25 ethyleneoxide and 1-25 propyleneoxide units or combinations thereof and have a viscosity in the range of about 1 cSt to about 100,000 cSt, about 5 cSt to about 50,000 cSt, or about 10 cSt to about 30,000 cSt.

Alkyl Polyalkylene Oxide

In embodiments of the invention, the alkyl polyalkylene oxide is selected from alkyl-polyethyleneoxides, alkyl-polypropyleneoxides and alkyl-polyethyleneoxide-polypropyleneoxide copolymers. The alkyl groups contain 1-30, 1-15 or 1-10 carbon atoms. The polyethyleneoxides, polypropyleneoxides and polyethyleneoxide-polypropyleneoxide section of the alkyl polyalkylene oxide is derived from 1-50 ethyleneoxide and 1-50 propyleneoxide units, or from 1-25 ethyleneoxide and 1-25 propyleneoxide units having a viscosity in the range of about 1 cSt to about 100,000 cSt, about 5 cSt to about 50,000 cSt or about 10 cSt to about 30,000 cSt.

In Use

In embodiments of the invention the active ingredients may be added to the aqueous drilling fluid diluted in a solvent for ease of handling or the active ingredients may be added separately to the aqueous drilling fluid. The active ingredients of the anti-accretion additive, as identified herein, are present in a volume from about 1 vol % to about 100 vol % of the total volume of the anti-accretion additive.

In embodiments of the invention, wherein the active ingredients are diluted in a solvent for forming the anti-accretion additive, the active ingredients are present in a volume from about 5 vol % to about 30 vol % of the total volume of the anti-accretion additive. In embodiments of the invention, the active ingredients are added from about 5 vol % to about 15 vol % or from about 10 vol % to about 15 vol % of the total volume of the anti-accretion additive. Additionally, the anti-accretion additive may comprise minor amounts of water and emulsifiers. Preparation of the anti-accretion additive by diluting in a solvent facilitates ease of handling of the active ingredients when preparing the drilling fluid on site.

In a case where the active ingredients are added directly to the aqueous drilling fluid, no solvent is required.

As previously noted, components of the anti-accretion additives are neither soluble in water nor in oil and typically migrate to an interface therebetween. Applicant believes that these properties are largely responsible for the surface and interfacial behavior of the anti-accretion additives between the aqueous drilling fluid and the surface of the bitumen. The components of the anti-accretion additive, regardless whether they are added to the drilling fluid separately or in a solvent, form an emulsion of fine droplets which are dispersed within the drilling fluid.

Emulsion stability is largely dictated by the droplet size of the discontinuous phase in either oil-in-water or water-in-oil emulsions. Generally, the smaller the droplet size the greater the stability of the emulsion. The anti-accretion additives according to embodiments of the invention when added to an aqueous drilling mud form a droplet size which is sufficiently small so as to effectively disperse the anti-accretion additive in the aqueous phase, but which is not so large as to cause coalescence of the droplets which would adversely affect the dispersion thereof. Typically shear, which results from pumping of the fluids downhole through the drill bit, further acts to maintain the small droplet size within the drilling fluid.

Anti-accretion additives, according to embodiments of the invention are added at a minimum of about 0.05 $L/m^3$ of the active ingredients to the total volume of the aqueous drilling mud. Applicant believes that as much as 6 $L/m^3$ or more of active ingredients may be added to the total volume of the aqueous drilling mud. Applicant believes that the amount of active ingredient required is largely dependent upon the amount and type of bituminous and heavy oil materials which are encountered in the formation.

An exemplary anti-accretion additive according to an embodiment of the invention, referred to herein as BMP-1, comprises a polysiloxane emulsion. BMP-1 is delivered to the drilling mud as an emulsion having a sufficiently small droplet size so as to be stable when dispersed within an aqueous drilling fluid.

In an embodiment, BMP-1 comprises 25.5% organopolysiloxane, 0.15% alkyl polyalkylene oxide and 4.35% of a co-polymer of organopolysiloxanes and polyalkylene oxides in a solvent, such as a blend of a refined hydrotreated hydrocarbon, for example ENVIRODRILL® (available from Innovative Chemical Technologies Canada, Calgary, Alberta, Canada) and glycol ether EB. BMP-1 may also comprise a minor amount of water and emulsifiers.

It is to be noted that the refined hydrotreated hydrocarbon solvents, such as ENVIRODRILL®, have a tendency to dissolve bitumen from the bitumen-coated solids and therefore, while these embodiments of the invention prevent accretion of bitumen to metal surfaces, there is a reduced ability to recycle the drilling mud when returned to surface. The bitumen, once dissolved in the drilling mud, is not readily removed with the solids using conventional solids control equipment.

For greater recyclability of the drilling mud, solvents such as refined hydrotreated hydrocarbons are to be avoided. In embodiments of the invention, BMP-1 is prepared and diluted in a silicone oil, such as an organopolysiloxane oil, which has no affinity for either the water or the bitumen. One such exemplary organopolysiloxane oil is polydimethylsiloxane oil. Using the silicone oil, bitumen does not dissolve in the returned drilling mud and remains with the returned solids. Thus, the bitumen can be removed from the drilling mud using conventional solids control equipment. Further, the addition of a silicone oil further aids in preventing accretion of bitumen.

It is generally understood in the prior art that calcium ions destabilize oil-in-water emulsions because of the effect of divalent cations on surfactant function. Surfactants are meant to facilitate dispersion and stability of droplets in the emulsion. When calcium is introduced, many calcium-surfactant-non-aqueous phase interactions occur, such as the formation of calcium soaps, which thereafter partition a larger amount of the surfactant to the non-aqueous phase thereby disrupting the stability of the emulsion. Thus, it is generally thought that droplet size would be increased with the addition of calcium ions.

Contrary to the conventional wisdom however, embodiments of the invention have an enhanced performance in the presence of calcium ions and the small droplet size is maintained. Detrimental effects resulting from bitumen accretion are dramatically reduced using embodiments of the invention, even in the presence of calcium ions. The enhanced performance has been observed in as little as 200 mg/L calcium and as high as 1500 mg/L calcium. Applicant believes that an upper limit for calcium may be reached when the calcium becomes so high as to interfere with anionic polymers added to the drilling fluid, causing the anionic polymers to coil up and lose effectiveness for the purpose for which they were added.

Aqueous drilling fluids for use in drilling through subterranean formations having at least bituminous or heavy oil materials therein comprise a polysiloxane, a copolymer of polysiloxane or mixtures thereof as active ingredients for preventing accretion of the bituminous or heavy oil materials to at least metal surfaces. Further, wherein the active ingredients are diluted in a silicone oil prior to addition to the aqueous drilling fluid, retention of the bituminous or heavy oil materials in the aqueous drilling fluid are minimized permitting the bituminous or heavy oil materials to be removed from the aqueous drilling fluid with conventional solids control equipment. The active ingredients are added at a minimum of 0.05 L/m3 to the total volume of the drilling fluid.

In a method for drilling through subterranean formations having bituminous or heavy oil materials therein, an anti-accretion additive is added to the aqueous drilling fluid. For greater recyclability of the drilling fluid, the active ingredients of the additive are first diluted in a silicone solvent before addition to the aqueous drilling fluid.

EXAMPLES

BMP-1

Polysiloxane Emulsions

A variety of formulations of polysiloxane emulsions (BMP-1), were prepared as follows:
Formulation 1:
  85 wt % of a blend of poly-dimethylsiloxane with 350 cSt viscosity and 5% hydrophobic silica;
  14.5 wt % of a copolymer from poly-dimethylsiloxane and polyethyleneoxide-polypropyleneoxide copolymers, with a viscosity of 13,750 cSt at ambient temperature; and
  0.5 wt % of butyl-polypropyleneoxide, with a viscosity of 165 cSt at 100° F.
Formulation 2:
  85 wt % of a blend of poly-dimethylsiloxane with 350 cSt viscosity and 10% of hydrophobic silica;
  14.5 wt % of a copolymer from poly-dimethylsiloxane and polyethyleneoxide-polypropyleneoxide copolymers, with a viscosity of 13,750 cSt at ambient temperature; and
  0.5 wt % of butyl-polypropyleneoxide, with a viscosity of 165 cSt at 100° F.
Formulation 3:
  85 wt % of poly-dimethylsiloxane with 350 cSt viscosity;
  14.5 wt % of a copolymer from poly-dimethylsiloxane and polyethyleneoxide-polypropyleneoxide copolymers, with a viscosity of 13,750 cSt at ambient temperature; and
  0.5 wt % of butyl-polypropyleneoxide, with a viscosity of 165 cSt at 100° F.
Formulation 4:
  80 wt % of poly-dimethylsiloxane with 350 cSt viscosity;
  19.4 wt % of a copolymer from poly-dimethylsiloxane and polyethyleneoxide-polypropyleneoxide copolymers, with a viscosity of 13,750 cSt at ambient temperature; and
  0.6 wt % of butyl-polypropyleneoxide, with a viscosity of 165 cSt at 100° F.
Formulation 5:
  85 wt % of silanol with 500-800 cSt viscosity;
  14.5 wt % of a copolymer from poly-dimethylsiloxane and polyethyleneoxide-polypropyleneoxide copolymers, with a viscosity of 13,750 cSt at ambient temperature; and
  0.5 wt % of butyl-polypropyleneoxide, with a viscosity of 165 cSt at 100° F.

Formulation 6:
- 85 wt % of silanol with 2500-3500 cSt viscosity;
- 14.5 wt % of a copolymer from poly-dimethylsiloxane and polyethyleneoxide-polypropyleneoxide copolymers, with a viscosity of 13,750 cSt at ambient temperature; and
- 0.5 wt % of butyl-polypropyleneoxide, with a viscosity of 165 cSt at 100° F.

Formulation 7:
- 85 wt % of poly-dimethylsiloxane with 12,500 cSt viscosity;
- 14.5 wt % of a copolymer from poly-dimethylsiloxane and polyethyleneoxide-polypropyleneoxide copolymers, with a viscosity of 13,750 cSt at ambient temperature; and
- 0.5 wt % of butyl-polypropyleneoxide, with a viscosity of 165 cSt at 100° F.

Formulation 8:
- 95 wt % of poly-dimethylsiloxane with 350 cSt viscosity;
- 4.85 wt % of a copolymer from poly-dimethylsiloxane and polyethyleneoxide-polypropyleneoxide copolymers, with a viscosity of 13,750 cSt at ambient temperature; and
- 0.15 wt % of butyl-polypropyleneoxide, with a viscosity of 165 cSt at 100° F.

Formulation 9:
- 50 wt % of poly-dimethylsiloxane with 350 cSt viscosity;
- 35 wt % of silanol with 500-800 cSt viscosity;
- 14.5 wt % of a copolymer from poly-dimethylsiloxane and polyethyleneoxide-polypropyleneoxide copolymers, with a viscosity of 13,750 cSt at ambient temperature; and
- 0.5 wt % of butyl-polypropyleneoxide, with a viscosity of 165 cSt at 100° F.

Formulation 10:
- 90 wt % of poly-dimethylsiloxane with 350 cSt viscosity;
- 9.7 wt % of a copolymer from poly-dimethylsiloxane and polyethyleneoxide-polypropyleneoxide copolymers, with a viscosity of 13,750 cSt at ambient temperature; and
- 0.3 wt % of butyl-polypropyleneoxide, with a viscosity of 165 cSt at 100° F.

Testing of Formulations of BMP-1

Testing of the various BMP-1 formulations was performed by rolling a steel bar (115 mm×25 mm) in 350 ml drilling fluid with 50 grams of bitumen (sourced from core samples) in an OFI Testing Equipment (OFITE) aging cell.

The drilling fluid comprised:
- 2 kg/m³ Xanthan Gum (Viscosifier);
- 5 L/m³ Aminodrill (Clay Stabilizer);
- 1 kg/m³ $CaCl_2$; and
- 0.05 L/m³ anti-accretion additive.

Each of the anti-accretion additive formulations was formulated so as to contain 30 vol % active ingredients in the total additive volume. The BMP-1 was diluted in ENVIRO-DRILL® prior to addition to the drilling fluid. The formulations were rolled in the OFITE cell with the steel bar for one hour at 400 psi at 40° C. to simulate any heat generated at the bit.

Results—Table A

Table A shows the maximum number of rolls for each example before failure was observed. Failure was determined when bitumen adhered to the bar. Further, the stability of the anti-accretion additive was observed.

TABLE A

| | | Results | | | |
|---|---|---|---|---|---|
| | | | Formulation Stability | | |
| Formulation | # of Rolls | 1-Day Stability | 3-Day Stability | 4-Day Stability | 6-Day Stability |
| 1 | 4 | Stable | | Stable | Stable |
| 2 | 4 | Stable | | Stable | Stable |
| 3 | 4 | Separated | | | |
| 4 | 4 | Separated | | | |
| 5 | 3 | Separated | | | |
| 6 | 3 | Trace separation | 2 mm separation | | Lots of separation |
| 7 | 2 | Stable | Trace separation | | 2-3 mm separation |
| 8 | 3 | Separated | | | |
| 9 | 2 | Separated | | | |
| 10 | 2 | Separated | | | |

Conclusions:

While all of the formulations tested showed an ability to prevent accretion of bitumen at the levels tested, many of the additive formulations showed varying degrees of instability over time.

Formulations 1 and 2 showed excellent anti-accretion properties and were stable over 6 days.

Formulation 1 was utilized for further testing as an exemplary anti-accretion additive according to an embodiment of the invention.

Examples

Formulation 1

The examples presented below are provided to illustrate the invention and are not meant to limit the scope of the invention as will be apparent to those skilled in the art.

All testing was performed by rolling a steel bar (115 mm×25 mm) in 350 ml of a conventional drilling fluid matrix, and 50 grams of bitumen (sourced from core samples) in an OFI Testing Equipment (OFITE) aging cell. Rolling times were for one hour and the test was performed at 40° C. to simulate heat generated at the bit.

BMP-1, according to formulation 1, was used as the anti-accretion additive.

Example 1

Effect of Pressure

Testing was performed to assess the effect of pressure on the test results to simulate pressure conditions of the fluid when circulated down-hole. A minimal amount of Xanthan, a conventional viscosifier, was added to the brine matrix, with and without the further addition of anti-accretion additive BMP-1.

TABLE B

| | Results | |
|---|---|---|
| | Ambient Pressure | 400 psi Pressure |
| 2 kg/m³ Xanthan | Bitumen sticking to bar and cell. | Bitumen sticking to bar and cell. |
| 2 kg/m³ Xanthan + 2 L/m³ BMP-1 | Bar and cell clean | Bar and cell clean |

Conclusions:

As seen in the results in Table B and in FIG. 3, some accretion or sticking of bitumen to the steel bar is observed at ambient pressure without the addition of BMP-1. As shown in FIG. 4, when elevated pressure (400 psi) equivalent to that of the hydrostatic pressure in a true vertical depth of approximately 300 m is applied to the OFITE cell, severe accretion occurs in the brine without the addition of BMP-1. The steel bar is substantially coated with bitumen.

Figure 5:
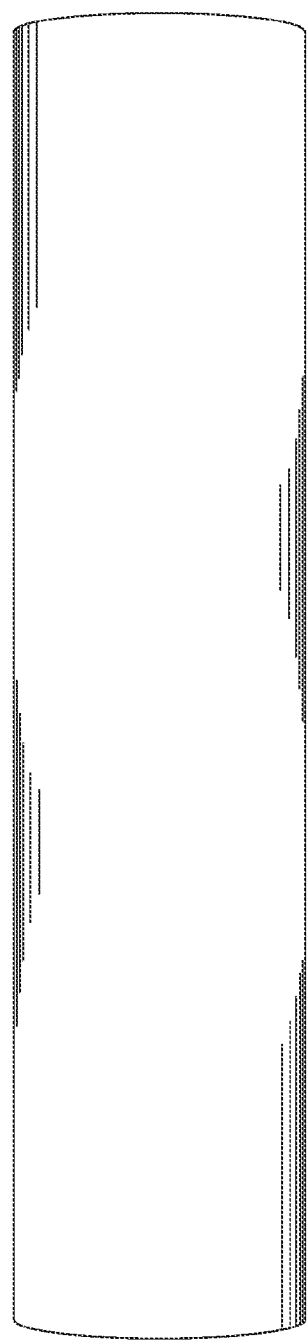
FIG. 5 illustrates significant inhibition of accretion with the addition of an anti-accretion additive according to an embodiment of the invention, according to Example 1 described herein, the metal surface being substantially free of any accretion thereon.

FIG. 5 illustrates that the addition of the anti-accretion additive (BMP-1) according to an embodiment of the invention effectively inhibits accretion of the bitumen, even at the elevated pressure. The steel bar is substantially free of any bitumen sticking thereto.

Example 2

Effect of Other Drilling Fluid Additives

Various drilling fluid additives are typically added to conventional drilling fluid systems. Thus, testing was performed adding a variety of common conventional additives to a brine base fluid to determine whether negative interactions were observed between the additives and the anti-accretion additive BMP-1 and whether there was any negative effect of the ability of the anti-accretion additive to prevent sticking.

The following additives are commonly used in the oil industry to formulate a drilling fluid:

1. Xanthan Gum (Viscosifier)
2. Polyanionic Cellulose [PAC] (Fluid Loss Additive)
3. Aminodrill* NPH (Clay Control) (* available from ICTC)

Each additive was mixed individually and in combination with BMP-1 and was rolled with the steel bar in the OFITE aging cell at 400 psi.

The steel bar was observed following rolling to determine any adverse effects in the presence of the anti-accretion additive.

TABLE C

Results

| Formulation | Observation |
| --- | --- |
| 3 kg/m$^3$ Xanthan + 2 L/m$^3$ BMP-1 | Bar and cell clean |
| 3 kg/m$^3$ PAC + 2 L/m$^3$ BMP-1 | Bar and cell clean |
| 5 L/m$^3$ Aminodrill NPH + 2 L/m$^3$ BMP-1 | Bar and cell clean |
| 3 kg/m$^3$ Xanthan + 2 L/m$^3$ BMP-1 + 2 kg/m$^3$ PAC + 5 L/m$^3$ Aminodrill NPH | Bar and cell clean |

Conclusions:

It is clear from the results in Table C that none of the conventional additives tested had a negative impact on the anti-accretion properties of BMP-1.

Further, when combined in a single fluid, the combination did not have a negative impact on the anti-accretion additive.

Example 3

Effect of Drilled Solids

During a drilling operation, it is expected that the drilling fluid would be exposed to formations that not only contain bitumen, but also to formations that contain swellable clay, such as in the Clearwater formation in Cold Lake Alberta, Canada.

For the purposes of the testing, the drilling fluid containing brine, some conventional additives and BMP-1 as the anti-accretion additive was contaminated with 30 kg/m$^3$ Wyoming bentonite, a highly swellable clay similar to the clays found in the Clearwater formation, prior to rolling in the OFITE aging cell at 400 psi.

TABLE D

Results

| Formulation | Observation |
| --- | --- |
| 3 kg/m$^3$ Xanthan + 2 L/m$^3$ BMP-1 + 2 kg/m$^3$ PAC + 5 L/m$^3$ Aminodrill NPH + 30 kg/m$^3$ Wyoming Bentonite | Bar and cell clean |

Conclusions:

Despite the addition of highly swellable clay, BMP-1 effectively prevented sticking of the bitumen to the OFITE cell or steel bar therein.

Example 4

Effect of Calcium

During a drilling operation, there is a chance that the drilling fluid could be contaminated with significant amounts of calcium which is known to have detrimental effects on the rheology of the mud system. The significant amounts of calcium typically result either from the natural composition of the formation drilled or from residual calcium present as a result of other operations, such as cementing.

Testing was performed in fluids contaminated with 200, 400, 700 and 1000 ppm calcium, over and above the amount of calcium present in the brine, prior to rolling in an OFITE aging cell at 400 psi.

TABLE E

Results

| Formulation | Observation |
| --- | --- |
| 3 kg/m$^3$ Xanthan + 2 L/m$^3$ BMP-1 + 200 ppm Calcium | Bar and cell clean |
| 3 kg/m$^3$ Xanthan + 2 L/m$^3$ BMP-1 + 400 ppm Calcium | Bar and cell clean |
| 3 kg/m$^3$ Xanthan + 2 L/m$^3$ BMP-1 + 700 ppm Calcium | Bar and cell clean |
| 3 kg/m$^3$ Xanthan + 2 L/m$^3$ BMP-1 + 1000 ppm Calcium | Bar and cell clean |

Conclusions:

As shown in the results in Table E, calcium had no detrimental effect on the anti-accretion properties of BMP-1 when present from 200 ppm to 1000 ppm.

Further, it was observed that BMP-1 showed enhanced anti-accretion performance in the presence of additional amounts of calcium.

Example 5

Effect on Fluid Properties

Testing using a Model 900 rheometer was performed in order to ascertain whether the addition of BMP-1 to a drilling fluid had any adverse affects on fluid rheology.

Mixing of the drilling mud, bitumen and conventional additives was performed for 20 minutes on a Hamilton Beach mixer with and without the addition of BMP-1 and further, in the presence of calcium. A drop in fluid properties would be indicative of a negative impact on the fluid properties.

TABLE F

| Results | | | |
|---|---|---|---|
| | Plastic Viscosity (m · Pa · s) | Yield Point (Pa) | Low Shear Rate Viscosity - 0.3 rpm (cP) |
| 3 kg/m³ Xanthan + 2 kg/m³ PAC | 16 | 10 | 1500 |
| 3 kg/m³ Xanthan + 2 L/m³ BMP-1 + 2 kg/m³ PAC | 17 | 17 | 2500 |
| 3 kg/m³ Xanthan + 2 L/m³ BMP-1 + 2 kg/m³ PAC + 300 ppm Calcium | 13 | 10 | 1500 |

Conclusions:

It is clear from the results in Table F, that the presence of BMP-1 or the combination of BMP-1 and calcium at about 300 ppm had no adverse effects on the rheology of the fluids tested.

Example 6

Efficiency of the System

In order to measure the efficiency of the anti-accretion additive on a drilling fluid system, the same drilling fluid was rolled with the steel bar multiple times to simulate repeated use of the same drilling fluid. The rolling was repeated until bitumen accretion was observed which was deemed a failure of the anti-accretion additive.

The fluid was rolled for one hour with 50 grams of bitumen. The bitumen was then screened out and another 50 grams of bitumen was added. The process was repeated without the addition of any additional BMP-1 until failure of the anti-accretion additive was observed. Failure was determined to be the presence of any bitumen stuck to the metal bar or cell.

The effect of the anti-accretion additive according to an embodiment of the invention, BMP-1, was compared to a commercially available anti-accretion additive employing encapsulation technology (CP905H available from Hychem, Canada).

TABLE G

| Results | | |
|---|---|---|
| Formulation | Concentration of Bitumen | Number of Rolls Before Failure |
| 3 kg/m³ Xanthan + 1 L/m³ BMP-1 | 286 kg/m³ | 2 |
| 3 kg/m³ Xanthan + 1 L/m³ BMP-1 + 200 ppm Calcium | 1430 kg/m³ | >10 |
| 3 kg/m³ Xanthan + 1 L/m³ BMP-1 + 400 ppm Calcium | 1430 kg/m³ | >10 |
| 3 kg/m³ Xanthan + 1 L/m³ BMP-1 + 1000 ppm Calcium | 1430 kg/m³ | >10 |
| 2 kg/m³ CP 905H** (Cationic Polyacrylamide) | 286 kg/m³ | 1 |
| 2 kg/m³ CP 905H** + 200 ppm Calcium | 143 kg/m³ | 0 |

Conclusions:

It is clear from the results in Table G that BMP-1 outperforms the current encapsulation technology in the absence of additional calcium.

Further, at additional amounts of calcium of about 200 ppm present, the efficiency of BMP-1 is increased by an order of magnitude over that of the conventional additive.

Example 7

Recyclability of Drilling Mud Containing an Anti-Accretion Additive According to an Embodiment of the Invention Testing was performed to simulate the performance of drilling fluids, with and without the addition of anti-accretion additives according to embodiment of the invention when subjected to high shear, such as when the drilling fluid passes through the drill bit and is returned to surface through the annulus. The drilling fluids were observed, following testing, to determine whether bitumen was retained in the drilling fluid or if it remained with the solids.

A drilling fluid (Sample 1) containing a conventional solvent/surfactant system was compared to a drilling fluid (Sample 2) containing an anti-accretion additive according to Formulation 1, diluted in a silicone oil, such as polydimethylsiloxane, for addition to the drilling mud.

The drilling fluid, according to an embodiment of the invention, comprised 2 kg/m³ Xanthan, 1 kg/m³ PAC. 1 kg/m³ CaCl$_2$ and 5 L/m³ BMP-1, the balance being water, for forming an aqueous drilling fluid. The drilling fluid, absent the BMP-1 and CaCl$_2$, was first mixed on a Hamilton Beach mixer to fully hydrate the polymers contained therein. After 20 minutes, the BMP-1 was added to the drilling fluid and about 1 minute later the CaCl$_2$ was added to the mixture.

To test the recyclability of the drilling mud, 70 g of bitumen-laden sand was added to each of the conventional drilling fluid and the fluid prepared according to an embodiment of the invention, as described. The drilling fluids were then subjected to high shear by mixing at about 13,000 rpm for 1 hour.

Results

Figure 6:
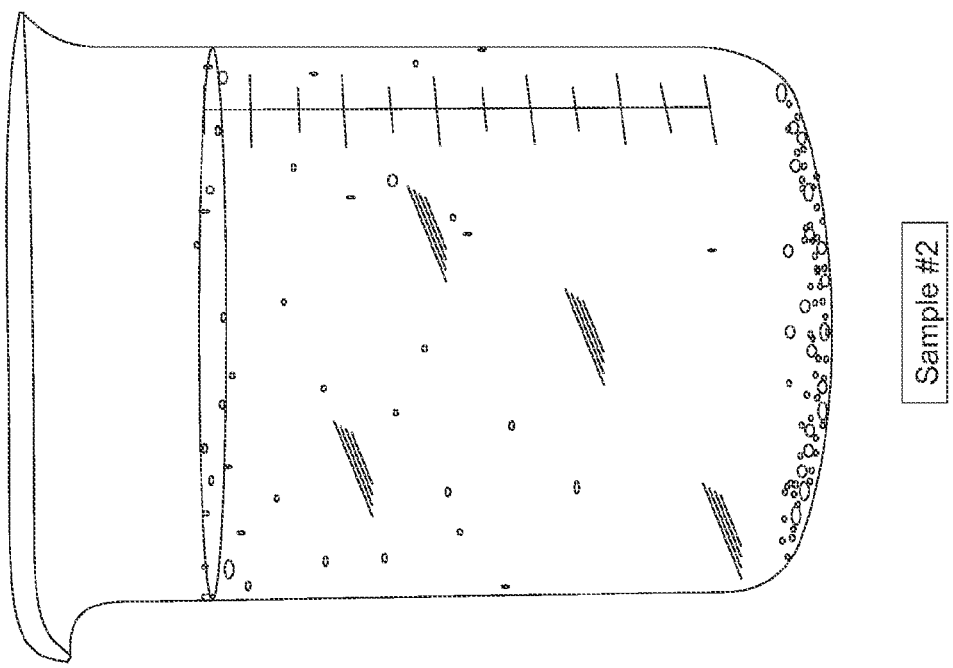
FIG. 6 represents a visual comparison of a test simulating a returned drilling fluid containing an anti-accretion additive according to an embodiment of the invention diluted in a silicone solvent, compared to a returned drilling mud having a conventional solvent surfactant and according to Example 7 described herein, the anti-accretion additive comprising the silicone surfactant showing substantially less retained bitumen therein.
Figure 6:
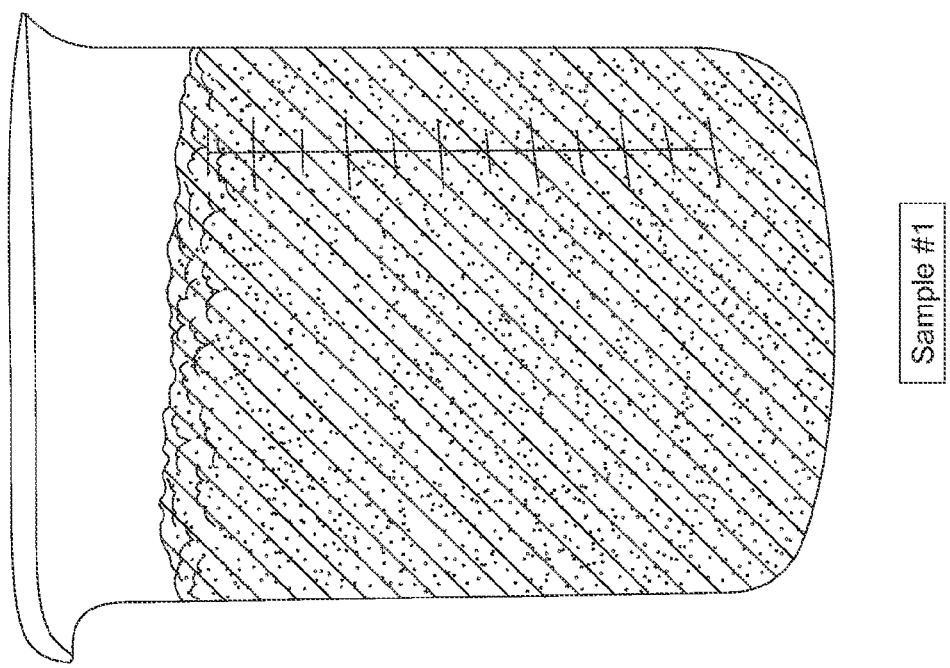

As shown in FIG. 6, after 1 hour a visual comparison was made between the conventional drilling fluid and the drilling fluid containing BMP-1 diluted in silicone oil.

The conventional fluid (Sample 1) appeared to have dissolved bitumen from the sand into the fluid. Sample 1 appears significantly darker than Sample 2.

The fluid containing BMP-1 diluted in polydimethysiloxane oil (Sample 2) appeared to have little or no bitumen dissolved within the fluid.

Conclusions:

Drilling fluids containing an anti-accretion additive according to an embodiment of the invention, does not appear to dissolve bitumen. The bitumen remains with the sand, and thus, the drilling fluid can be recycled by removal of the sand and bitumen using conventional solids control equipment.

The invention claimed is:

1. A non-water soluble bitumen anti-accretion additive adapted for addition to an aqueous drilling mud used in subterranean formations having at least bituminous or heavy oil materials therein, wherein the bitumen anti-accretion additive comprises the following ingredients admixed in a refined hydrotreated hydrocarbon solvent:
   from 15-28.5 wt % of an organopolysiloxane;
   from 1.455-4.35 wt % of a co-polymer of a polydimethylsiloxane polymer and a polyalkylene oxide polymer having a viscosity of 10 cSt to 30,000 cSt, wherein the polydimethylsiloxane polymer is connected to the polyalkylene oxide polymer via either an alkylene or a oxyalkyl linkage; and from 0.045-0.15 wt % alkyl polyalkylene oxide,
wherein when in contact with bitumen or bitumen-containing solids in the aqueous drilling mud, the bitumen anti-accretion additive has sufficient viscosity to form a stable emulsion in the aqueous drilling mud, minimizes sticking of the bitumen to metal surfaces, and lacks a surfactant that will solvate the bituminous or heavy oil materials into the aqueous drilling mud such that the drilling mud is recyclable in further drilling operations.

2. The bitumen anti-accretion additive of claim 1 wherein the polyalkylene oxide polymer component of the co-polymer is selected from polyethyleneoxides, polypropyleneoxides or polyethyleneoxide-polypropyleneoxide copolymers.

3. The bitumen anti-accretion additive of claim 1, wherein the organopolysiloxane is selected from the group comprising polyalkylsiloxanes, polyalkylsiloxane polyols, aminosiloxanes, polyalkylsiloxanes containing fine particles and mixtures thereof.

4. The bitumen anti-accretion additive of claim 1, wherein the organopolysiloxane has a viscosity of between 350 cSt and 12,500 cSt.

5. The bitumen anti-accretion additive of claim 1, wherein the alkyl polyalkylene oxide is selected from the group comprising alkyl-polyethyleneoxides, alkylpolypropyleneoxides and alkyl-polyethyleneoxide-polypropyleneoxide copolymers, the alkyl groups having from 1 to about 30 carbon atoms, the polyethyleneoxides, polypropyleneoxides and polyethyleneoxide-polypropyleneoxide portions being derived from 1-50 ethyleneoxide and 1-50 propyleneoxide units, or from 1-25 ethyleneoxide and 1-25 propyleneoxide units and mixtures thereof.

6. The bitumen anti-accretion additive of claim 1, further comprising hydrophobic silica.

7. The bitumen anti-accretion additive of claim 1, wherein the co-polymer of the polydimethylsiloxane polymer and the polyalkylene oxide polymer has a viscosity of about 13,750 cSt at ambient temperature.

8. An aqueous drilling mud comprising the bitumen anti-accretion additive according to claim 1.

9. A method for minimizing bitumen accretion to metal surfaces and for minimizing bitumen retention in an aqueous drilling mud returned to surface from a subterranean formation comprising:
adding to the aqueous drilling mud, a non-water soluble bitumen anti-accretion additive having sufficient viscosity to form a stable emulsion in the aqueous drilling mud, the bitumen anti-accretion additive comprising from 15-28.5 wt % of an organopolysiloxane, from 1.455-4.35 wt % of a co-polymer of a polydimethylsiloxane polymer and a polyalkylene oxide polymer having a viscosity of 10 cSt to 30,000 cSt, and from 0.045-0.15 wt % alkyl polyalkylene oxide, admixed in a refined hydrotreated hydrocarbon solvent, and
utilizing the aqueous drilling mud comprising the bitumen anti-accretion additive during drilling wherein, when in contact with bitumen or bitumen-containing solids in the aqueous drilling mud, the bitumen anti-accretion additive minimizes sticking of the bitumen to metal surfaces and lacks a surfactant that will solvate the bituminous or heavy oil materials into the aqueous drilling mud.

10. The method for minimizing bitumen accretion to metal surfaces and for minimizing bitumen retention in an aqueous drilling fluid of claim 9, wherein the bitumen anti-accretion additive further comprises hydrophobic silica.

11. The method for minimizing bitumen accretion to metal surfaces and for minimizing bitumen retention in an aqueous drilling fluid of claim 9, further comprising recycling the aqueous drilling mud when returned to the surface.

12. A drilling fluid for use in drilling subterranean hydrocarbon formations containing bitumen and/or heavy hydrocarbons comprising:
an aqueous drilling mud; and
a non-water soluble additive comprising from 15-28.5 wt % of an organopolysiloxane, from 1.455-4.35 wt % of a co-polymer of a polydimethylsiloxane polymer and a polyalkylene oxide polymer having a viscosity of 10 cSt to 30,000 cSt, and from 0.045-0.15 wt % alkyl polyalkylene oxide, together admixed in a refined hydrotreated hydrocarbon solvent;
the additive having sufficient viscosity to form a stable emulsion in the aqueous drilling mud for at least one day and minimizes sticking of the bitumen or heavy hydrocarbons to metal surfaces while lacking a surfactant that will solvate the bituminous or heavy oil materials into the aqueous drilling mud such that the drilling mud is recyclable in further drilling operations when returned from the subterranean hydrocarbon formation.

13. A method for minimizing sticking of bitumen or heavy hydrocarbons to metal surfaces in contact with an aqueous drilling mud and minimizing dispersion of bitumen or heavy hydrocarbons to the aqueous drilling mud from an underground formation in contact therewith, the method comprising:
adding to the aqueous drilling mud a surfactant free non-water soluble additive comprising from 15-28.5 wt % of an organopolysiloxane having a viscosity of from 100 to 100,000 cSt, from 1.455-4.35 wt % of a co-polymer of a polydimethylsiloxane polymer and a polyalkylene oxide polymer, wherein the polydimethylsiloxane polymer is connected to the polyalkylene oxide polymer via either an alkylene or an oxy-alkyl linkage, and from 0.045-0.15 wt % alkyl polyalkylene oxide, together admixed in a refined hydrotreated hydrocarbon solvent, wherein the additive forms an emulsion that is stable from separation from the aqueous drilling mud and minimizes dispersion of the bitumen or heavy hydrocarbon to the aqueous drilling mud.

14. The method of claim 13 further comprising:
drilling a formation having bitumen and or heavy hydrocarbons therein using the aqueous drilling mud and additive;
returning the aqueous drilling mud and solids therein to surface;
removing solids from the aqueous drilling mud,
wherein the bitumen and/or heavy hydrocarbons remain with the solids, and
recycling the aqueous drilling mud into the formation.

15. The drilling fluid of claim 12, wherein the aqueous drilling mud further comprises calcium.

* * * * *